Sept. 17, 1957 S. T. SEMEGEN 2,806,824
COMPOSITION OF MATTER FOR MAKING GOLF BALL COVERS
Filed Feb. 3, 1954
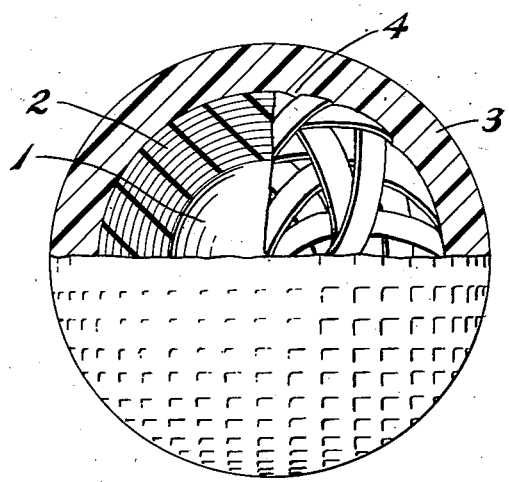
INVENTOR.
STEPHEN T. SEMEGEN
BY
ATTY

United States Patent Office 2,806,824
Patented Sept. 17, 1957

2,806,824

COMPOSITION OF MATTER FOR MAKING GOLF BALL COVERS

Stephen T. Semegen, Cuyahoga Falls, Ohio, assignor to The B. F. Goodrich Company, New York, N. Y., a corporation of New York Application February 3, 1954, Serial No. 407,884

8 Claims. (Cl. 260—4)

This invention relates to novel compositions comprising a blend of rubbery material with a tough, horny, resinous material characterized by being especially useful in the manufacture of golf ball covers.

It is an object of this invention to provide compositions suitable for golf ball covers which have the necessary physical properties such as "click," resistance to cutting, toughness, and processability.

It is another object to provide such compositions more economically than the compositions conventionally used.

It is still another object to provide compositions which may or may not be vulcanized.

These and other objects and advantages of the present invention will become more apparent to those skilled in the art from the following detailed description, examples, and drawing which is an elevation partly in section of a golf ball containing the novel cover composition of the present invention.

It has now been discovered according to the present invention that a blend of a rubbery material such as natural or synthetic rubber with a tough, horny, resinous material having a softening point of from about 140 to 250° F. and which is the polymerization product of a monomeric ester of methacrylic acid and a monomeric ester of acrylic acid wherein the total number of carbon atoms in the alcohol derived groups of the esters is less than 12 provides a golf ball cover composition having the desired characteristics of easy processing, having good shell-forming characteristics, having good final molding characteristics, and having good rebound, cut resistance, and "click." Balls covered with these compositions travel further upon being driven than do likequality balls having conventional covers. As shown in the drawing, a golf ball made in accordance with the present invention generally comprises core 1, wrapped thread center 2 and a cover 3. The fused cover is shown at 4 to have melted and flowed between the outer threads of the center to provide greater adherence between the cover and the center.

The first monomer of the resinous polymerization product is an ester of the general formula

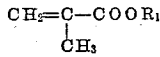

wherein $R_1$ is an alkyl group having from 1 to 8 carbon atoms. Some of the alkyl esters of methacrylic acid which may be used are methyl methacrylate, ethyl methacrylate, propyl methacrylate, butyl methacrylate, isobutyl methacrylate, tertiary butyl methacrylate, tertiary amyl methacrylate, n-hexyl methacrylate, 2-ethyl hexyl methacrylate, and other similar methacrylates.

The other monomer copolymerizable with the methacrylate ester to form the resin is an acrylic acid ester. Examples of suitable esters are methyl acrylate, ethyl acrylate, isopropyl acrylate, butyl acrylate, n-amyl acrylate, 2-ethyl hexyl acrylate, n-octyl acrylate, phenyl acrylate, furfuryl acrylate, tetrahydrofurfuryl acrylate, methoxy ethyl acrylate, methyl β-furyl acrylate, and other similar acrylic acid ester compounds falling within the scope of the general formula

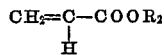

where $R_2$ is alkyl, aryl, —$R_3OR_4$ where $R_3$ is an alkylene radical and $R_4$ is an alkyl radical and furyl.

The total number of carbon atoms in the alcohol derived groups of the methacrylate and acrylate monomers used to form the resinous copolymer should be less than 12 to afford the proper softening point within the aforementioned range and the proper hardness so that when mixed with the rubbery component a satisfactory golf ball cover composition will be obtained. For example, the methacrylate can have 8 carbon atoms in its alcohol derived group ($R_1$) while the acrylate can have 3 carbon atoms in its alcohol derived group ($R_2$). On the other hand, the acrylate monomer may have 10 carbon atoms in its alcohol derived group with the methacrylate monomer having 1 carbon atom in its alcohol derived group. Where the total number of carbon atoms is twelve or greater, the copolymer has a softening point and a hardness which are too low to form with the rubbery component a satisfactory cover material.

The resinous component is made by polymerizing a mixture of the foregoing monomers containing from 50% to 90% by weight of the alkyl methacrylate and preferably from 50% to 70% by weight of the alkyl methacrylate, the balance being the acrylic acid ester.

The rubbery component is any vulcanizable rubber including such natural occurring crude rubbers as caoutchouc, which is essentially a rubbery polymer of isoprene, and the like, or such synthetic rubbers as rubbery polychloroprene and rubbery polymers of the open-chain conjugated dienes having from 4 to 8 carbon atoms such as the butadiene-1,3 hydrocarbons which include butadiene-1,3, isoprene, 2,3-dimethyl butadiene-1,3, 1,4-dimethyl butadiene-1,3 and the like; or the rubbery copolymers of these and similar materials with each other or with at least one copolymerizable monomeric material such as isobutylene, styrene, acrylonitrile, methacrylonitrile, methyl acrylate, methyl methacrylate, ethyl acrylate, ethyl methacrylate, 2-vinyl pyridine, and similar materials. The rubbery diene polymers generally contain at least 50% by weight of the conjugated diene, preferably from 50 to 75% by weight.

The rubbery polymer component will vary from about 20% to 200% by weight of the resinous polymer component. The rubbery polymer may be added in admixture with from 20% to 100% of its weight of pearl-type animal glue.

Other ingredients may be added to the composition, among which are any of the long-chain synthetic polymeric amides, cyclicized rubber, polyethylene, balata compositions, etc. Other usual rubber compounding ingredients including accelerators and pigments may be added as desired. These compositions may or may not be vulcanized. By adding a vulcanizing agent to any of the blends of this invention with no other necessary change in proportions of components, vulcanizable compounds are provided. This flexibility is advantageous since both vulcanized and unvulcanized compositions have advantages which make them desirable for certain applications. If no accelerator or vulcanizing agent is used, the resinous-rubbery compositions are used to form half shells, and pressed about golf ball centers by the application of heat and pressure. Heat is used here for molding but not for curing as such.

After polymerization, the resinous copolymer and rubbery copolymer of polymer are mixed thoroughly on a rubber mixing mill at a temperature of from about 160 to 225° F. or higher and usually at about 180° F. until a uniform mixture is obtained. Alternatively, aqueous emulsions of the polymers may be mixed and then coagulated together.

Next, pieces of the stock are cut and placed in shell-forming molds and under a platen pressure of from 250 to 500 p. s. i. pressed at a temperature of about 180° F. to form hemispherical shells. The shells are allowed to cool in the molds and then removed. Instead of applying heat to the molds, the hot stock from the mill rolls, if such is used, can be placed directly in the cold molds and the requisite pressure applied. Further, if desired the mold can be heated after the hot stock is placed therein. Total heating and cooling will require from approximately 1 to 3 minutes.

Finally, golf ball centers are inserted between the shells and the resulting assembly placed in golf ball molds, heated to a temperature of from 212 to 225° F. at platen pressures of from 250 to 500 p. s. i., and allowed to cool in the molds. The total heating and cooling cycle will be from 8 to 6 minutes. If higher temperatures are used, shorter times will be required to avoid overheating the center.

The hereinabove described temperatures, times and pressures can, of course, be varied somewhat depending on the particular resinous and rubbery polymer employed and the amounts thereof with achievement of the same results.

The following examples will serve to illustrate the invention with more particularity to those skilled in the art:

EXAMPLE I

A resinous copolymer of methyl methacrylate and ethyl acrylate is prepared from the following recipe in which the parts are by weight:

| | Parts |
|---|---|
| Methyl methacrylate | 200 |
| Ethyl acrylate | 200 |
| Sodium stearate | 20 |
| Potassium persulfate | 2.4 |
| Water | 760 |

The potassium persulfate is dissolved in a portion of the water to form a 3% solution, and the sodium stearate is dissolved in the remaining water. The solutions are then mixed and poured into a polymerization vessel followed by addition of the methyl methacrylate and ethyl acrylate to the mixture. This mixture is polymerized for from two to fourteen hours with constant agitation. The resultant latex is coagulated using conventional methods and the crumbs washed and dried. The resin obtained is a horny material which can be milled, and it is then mixed with a rubbery 60:40 butadiene-1,3:styrene copolymer. The recipe for the resin-rubber composition is as follows, parts being by weight:

| | Parts |
|---|---|
| Resinous 50:50 methyl methacrylate:ethyl acrylate copolymer | 40 |
| Rubbery 60:40 butadiene-1,3:styrene copolymer | 35 |
| Pearl-type animal glue | 15 |
| Titanium dioxide | 6 |
| Zinc stearate | 4 |

The resinous and rubbery copolymers are mixed on a roll mill at a temperature of about 180° F. and the other ingredients are added in the usual manner. The composition is cut from the mill and pieces of the sheet stock are cut and placed in golf ball cover shell molds; by application of heat and pressure (180° F. for 2 minutes at 300 p. s. i.) hemispherical shells are produced. After these shells are trimmed, conventional golf ball centers are inserted between pairs of shells and the whole placed in a mold and heated (218° F. for a few minutes at 300 p. s. i.) to form the balls. The balls are then cooled while in the mold, the total heating and cooling cycle being about six minutes. They are then unloaded, buffed and painted.

EXAMPLE II

The resinous 50:50 methyl methacrylate:ethyl acrylate copolymer of Example I is blended with a rubbery 50:50 butadiene-1,3:styrene copolymer as follows, the parts being by weight:

| | Parts |
|---|---|
| Resinous 50:50 methyl methacrylate:ethyl acrylate copolymer | 40 |
| Rubbery 50:50 butadiene-1,3:styrene copolymer | 35 |
| Pearl-type animal glue | 15 |
| Titanium dioxide | 6 |
| Zinc stearate | 4 |

These ingredients are mixed on a mill and processed into golf ball covers substantially as in Example I.

EXAMPLE III

The resinous 50:50 methyl methacrylate:ethyl acrylate copolymer of Example I is blended with a rubbery 50:50 butadiene-1,3:methyl methacrylate copolymer as follows, the parts being by weight:

| | Parts |
|---|---|
| Resinous 50:50 methyl methacrylate:ethyl acrylate copolymer | 42.5 |
| Rubbery 50:50 butadiene-1,3:methyl methacrylate copolymer | 32.5 |
| Pearl-type animal glue | 15 |
| Titanium dioxide | 6 |
| Zinc stearate | 4 |

These ingredients are mixed on a mill and processed into golf ball covers substantially as in Example I.

Driving tests and cutting tests indicate that balls with covers of these new compositions are better than No. 1 grade balls with conventional balata covers used as a control. The tensile strength and the elongation of the cover compositions are substantially equal to that of a conventional balata cover.

Additional resinous copolymers were prepared in which the types of monomers used to make the resinous component of the golf ball cover composition were varied. The procedure followed in preparing these copolymers is indicated in Example IV, below, and the data obtained are shown in Table A and compared with methyl methacrylate-ethyl acrylate resinous copolymer and balata.

EXAMPLE IV 5 parts by weight of Ivory soap flakes were dissolved in 200 parts of water containing 1½ parts of potassium persulfate. To this solution was added 50 parts by weight of methyl methacrylate monomer and 50 parts by weight of methyl acrylate monomer. The mixture was stirred and polymerization was effected by heating to 60° F. for 16 hours. After polymerization was complete, the reactants were treated with salt and acid to coagulate the polymer, the mixture filtered to remove $H_2O$, and the coagulated polymer dried in an air-oven at 50° C. to constant weight. The yield was almost 100%.

*Table A*

VARIATION IN MONOMER TYPES IN RESINOUS COPOLYMER

| Run No. | Alkyl Group of Methacrylate Monomer | Percent by Weight Alkyl Methacrylate Monomer | Alkyl Group of Acrylate Monomer | Percent by Weight Alkyl Acrylate Monomer | Carbon Atoms in Alcohol Group of Methacrylate | Carbon Atoms in Alcohol Group of Acrylate | Total Carbon Atoms in Alcohol Groups of Esters | Softening (milling) Point of Copolymer, °F. | Shore D Hardness of Copolymer |
|---|---|---|---|---|---|---|---|---|---|
| 1 | Methyl | 50 | Methyl | 50 | 1 | 1 | 2 | 175 | 75 |
| 2 | ----do---- | 50 | Butyl | 50 | 1 | 4 | 5 | 160 | 35 |
| 3 | ----do---- | 50 | Octyl | 50 | 1 | 8 | 9 | 150 | 35 |
| 4 | Butyl | 50 | Ethyl | 50 | 4 | 2 | 6 | 140 | 25 |
| 5 | Ethyl | 50 | ---do--- | 50 | 2 | 2 | 4 | 160 | 30 |
| 6 | Butyl | 50 | Octyl | 50 | 4 | 8 | 12 | 120 | 5 |
| 7 | Methyl | 50 | Ethyl | 50 | 1 | 2 | 3 | 140 | 70 |
| 8 | Balata | | | | | | | 160 | 45 |
| 9 | Balata plus glue and rubber. | | | | | | | 160 | 25 |

The data in the foregoing table indicate that satisfactory tough, horny, resinous copolymers can be obtained where the total number of carbon atoms in the alcohol derived groups of both esters are less than 12. These resinous copolymers will form acceptable golf ball covers when mixed with rubbers. Where the total number of carbon atoms is 12 or greater, copolymers having lowered softening points as shown by butyl methacrylate and octyl acrylate are obtained. Also, at or above the limit of 12 carbon atoms, the Shore hardness of the resulting copolymers is too low.

Additional tough, horny, resinous copolymers were prepared in which the amount of the monomers were varied. These compositions likewise could be readily blended with rubbery materials to make satisfactory golf ball cover materials. The general method of preparing the copolymers and the results obtained are shown in Example V and Table B below:

EXAMPLE V 5 parts by weight of Ivory soap flakes were dissolved in 200 parts by weight of water containing 1½ parts by weight of potassium persulfate. To this solution was added 70 parts by weight of methyl methacrylate monomer and 30 parts by weight of ethyl acrylate monomer. The mixture was stirred and polymerization was effected by heating to 60° F. for 16 hours. After polymerization was complete, the reactants were treated with salt and acid to coagulate the polymer, the mixture filtered to remove H₂O, and the coagulated polymer dried in an air-oven at 50° C. to constant weight. The yield was almost 100%. The resulting material was tough, horny, resinous, inelastic and like a 50:50 methyl methacrylate-ethyl acrylate copolymer.

In summary, the present invention teaches that novel compositions of matter useful as golf ball cover materials can be readily prepared by blending a rubbery conjugated diene polymer with a polymer prepared by copolymerizing an alkyl methacrylate with an acrylic acid ester wherein the total number of carbon atoms in the alcohol derived groups of both esters is less than 12 and characterized by being tough, horny, resinous and having softening points of from about 140 to 250° F.

This application is a continuation-in-part of prior copending application of Stephen T. Semegen, Serial Number 140,957, filed January 27, 1950, entitled "Blend of Rubbery Material and Copolymer of Alkyl Acrylate and Monoethylenic Compound," now abandoned.

The present invention is not limited by the specific examples listed herein for illustration. Rather the invention covers blends of a rubbery component and a resinous component as defined in the following claims.

What is claimed is:

1. A mill mixed golf ball cover composition comprising a tough, horny, resinous 50:50 copolymer of methyl methacrylate and ethyl acrylate having a softening point of about 140° F. and from about 20 to 200%, by weight of said resinous copolymer, of a rubbery conjugated diene polymer.

2. A mill mixed golf ball cover composition comprising a tough, horny, resinous 50:50 copolymer of methyl methacrylate and ethyl acrylate having a softening point of about 140° F. and from about 20 to 200% by weight of said resinous copolymer of a rubbery copolymer of butadiene-1,3 and styrene.

3. A mill mixed golf ball cover composition comprising a tough, horny, resinous 50:50 copolymer of methyl methacrylate and ethyl acrylate having a softening point

*Table B*

VARIATION IN PROPORTIONS OF MONOMERS IN RESINOUS COPOLYMER

| Run No. | Alkyl Group of Methacrylate Monomer | Percent by Weight of Alkyl Methacrylate Monomer | Alkyl Group of Acrylate Monomer | Percent by Weight of Alkyl Acrylate Monomer | Carbon Atoms in Alcohol Group of Methacrylate | Carbon Atoms in Alcohol Group of Acrylate | Total Carbon Atoms in Alcohol Group of Esters | Softening (milling) Point of Copolymer, °F. | Shore D Hardness of Copolymer |
|---|---|---|---|---|---|---|---|---|---|
| 11 | Methyl | 70 | Ethyl | 30 | 1 | 2 | 3 | 200 | 65 |
| 12 | ---do--- | 90 | ---do--- | 10 | 1 | 2 | 3 | 250 | 75 |
| 13 | ---do--- | 70 | Butyl | 30 | 1 | 4 | 5 | 185 | 75 |
| 14 | ---do--- | 90 | ---do--- | 10 | 1 | 4 | 5 | 240 | 85 |

The results in Table B above indicate that considerable variation can be made in the proportions of the various monomers employed in preparing the resinous copolymers to still obtain materials exhibiting satisfactory softening points and hardnesses and which can be blended with rubbers to form satisfactory golf ball cover materials.

of about 140° F., from about 20 to 200% by weight of said resinous copolymer of a rubbery copolymer of at least 50% by weight of butadiene-1,3 and the balance styrene, and from 20% to 100% by weight of said rubbery copolymer of pearl type animal glue.

4. A mill mixed golf ball cover composition comprising a tough, horny, resinous 50:50 copolymer of methyl methacrylate and ethyl acrylate having a softening point of about 140° F. and from about 20 to 200% by weight of said resinous copolymer of a rubbery copolymer of butadiene-1,3 and methyl methacrylate.

5. A mill mixed composition of matter comprising a tough, horny, resinous polymer having a softening point of from about 140 to 250° F. and consisting essentially of from 50 to 90% by weight of a monomer of an alkyl ester of methacrylic acid of the general formula

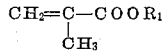

wherein $R_1$ is an alkyl group having from 1 to 8 carbon atoms and the balance ethyl acrylate, and from about 20 to 200% by weight of said resinous polymer of a rubbery polymerized conjugated diene.

6. A mill mixed composition of matter comprising a tough, horny, resinous polymer having a softening point of from about 140° F. to 50° F. and consisting essentially of from 50 to 70% by weight of a monomer of an alkyl ester of methacrylic acid of the general formula

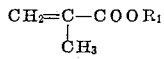

wherein $R_1$ is an alkyl group having from 1 to 8 carbon atoms and the balance ethyl acrylate, and from about 20 to 200% by weight of said resinous polymer of a rubbery polymer containing from 50% to 75% by weight of a polymerized conjugated diene.

7. A mill mixed composition of matter comprising a tough, horny, resinous polymer having a softening point of from about 140 to 250° F. and consisting essentially of 50% by weight of a monomer of an alkyl ester of methacrylic acid of the general formula

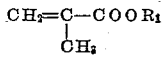

wherein $R_1$ is an alkyl group having from 1 to 8 carbon atoms and the balance ethyl acrylate and from about 20 to 200% by weight of said resinous polymer of a rubbery polymer of a conjugated diene, said composition characterized by being tough and by exhibiting click, cut resistance, good rebound and good processing characteristics when employed as a golf ball cover composition for a golf ball center.

8. A mill mixed composition comprising a tough, horny, resinous polymer having a softening point of from about 140 to 250° F. and consisting essentially of from 50 to 90% by weight of methyl methacrylate and the balance ethyl acrylate and from about 20 to 200% by weight of said resinous polymer of a rubbery polymerized conjugated diene.

References Cited in the file of this patent

UNITED STATES PATENTS

| | | |
|---|---|---|
| 2,078,881 | Munzinger | Apr. 27, 1937 |
| 2,109,948 | Olin | Mar. 1, 1938 |
| 2,117,321 | Hill | May 17, 1938 |
| 2,140,048 | Fikentscher et al. | Dec. 13, 1938 |
| 2,209,928 | Nowak et al. | July 30, 1940 |
| 2,517,127 | Meitzner | Aug. 1, 1950 |
| 2,614,093 | Wheelock | Oct. 14, 1952 |
| 2,643,125 | Juve | June 23, 1953 |

FOREIGN PATENTS

| | | |
|---|---|---|
| 494,031 | Great Britain | Oct. 19, 1938 |
| 644,022 | Great Britain | Oct. 4, 1950 |

OTHER REFERENCES

Modern Plastics, October 1948, pp. 99–103.

Bacon et al.: Proceedings of Rubber Technology Conference, London, 1938, pp. 525–536.